United States Patent
Pfaller et al.

(10) Patent No.: US 10,040,546 B2
(45) Date of Patent: Aug. 7, 2018

(54) BAR OF COMPOSITE MATRIX MATERIAL

(71) Applicant: AIRBUS HELICOPTERS DEUTSCHLAND GMBH, Donauworth (DE)

(72) Inventors: Rupert Pfaller, Riemerling (DE); Wolfgang J. Wagner, Inning Am Holz (DE); Martin Ortner, Unterhaching (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 1052 days.

(21) Appl. No.: 14/228,557

(22) Filed: Mar. 28, 2014

(65) Prior Publication Data
US 2016/0159474 A1 Jun. 9, 2016

(30) Foreign Application Priority Data
Mar. 28, 2013 (EP) ..................... 13400005

(51) Int. Cl.
*B64C 27/33* (2006.01)
*B32B 5/12* (2006.01)
*B32B 5/26* (2006.01)

(52) U.S. Cl.
CPC ........... *B64C 27/33* (2013.01); *B32B 5/12* (2013.01); *B32B 5/26* (2013.01); *B32B 2307/542* (2013.01); *B32B 2603/00* (2013.01)

(58) Field of Classification Search
CPC ......... B64C 27/33; B64C 27/48; B64C 11/04; B64C 11/06; B64C 11/12
See application file for complete search history.

(56) References Cited

U.S. PATENT DOCUMENTS

| | | | |
|---|---|---|---|
| 4,648,800 A | 3/1987 | Fradenburgh et al. | |
| 5,690,474 A | 11/1997 | Byrnes et al. | |
| 5,820,344 A * | 10/1998 | Hamilton | B64C 27/33 416/134 A |
| 6,375,426 B1 | 4/2002 | Brack et al. | |
| 6,659,722 B2 * | 12/2003 | Sehgal | B64C 27/473 416/134 A |
| 7,807,258 B2 * | 10/2010 | Liu | B29C 70/202 428/292.1 |
| 2006/0204364 A1 | 9/2006 | Li et al. | |

FOREIGN PATENT DOCUMENTS

| | | |
|---|---|---|
| EP | 2246257 | 11/2010 |
| JP | 2010143484 | 7/2010 |

OTHER PUBLICATIONS

European Search Report for EP 13400005, Completed by the European Patent Office dated Aug. 26, 2013, 4 Pages.

* cited by examiner

*Primary Examiner* — Woody Lee, Jr.
*Assistant Examiner* — Cameron Corday
(74) *Attorney, Agent, or Firm* — Brooks Kushman P.C.

(57) ABSTRACT

In a rotary wing aircraft a bar (1) of composite matrix material has a longitudinal axis (8) perpendicular to a cross section with upper and lower surfaces (2, 3). At least one torsion box (17) comprises an upper and a lower layers (10, 21, 11, 22) respectively offset of a longitudinal axis (8) and of the upper and the lower surfaces (2, 3), said upper and lower layers (10, 21, 11, 22) being laterally joint, while cross sections are filled with the first group of fibers extending essentially parallel to the longitudinal axis (8).

20 Claims, 2 Drawing Sheets

B-B

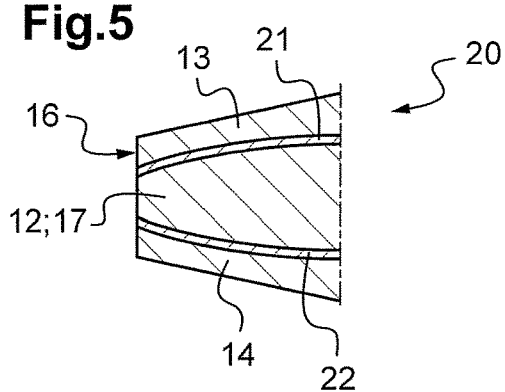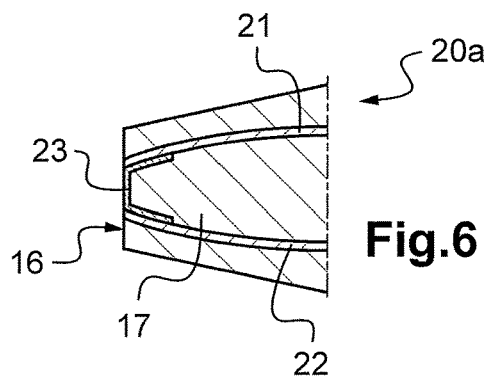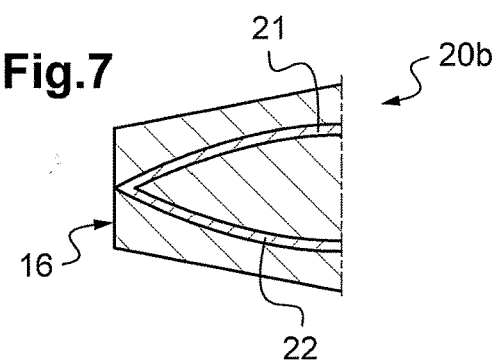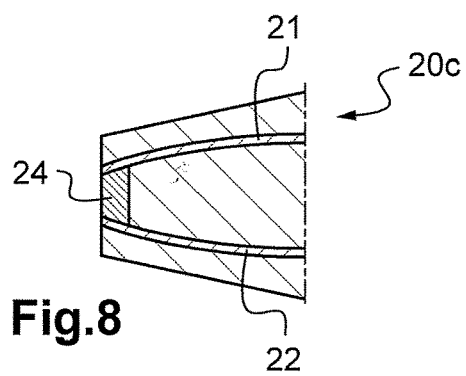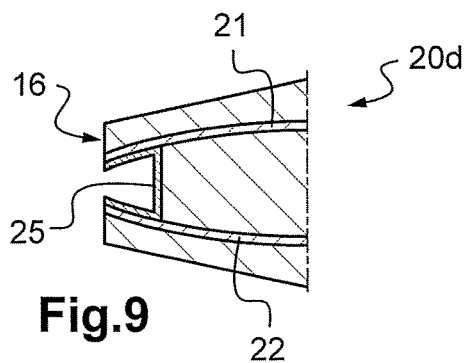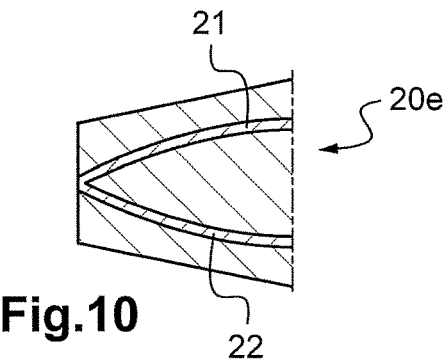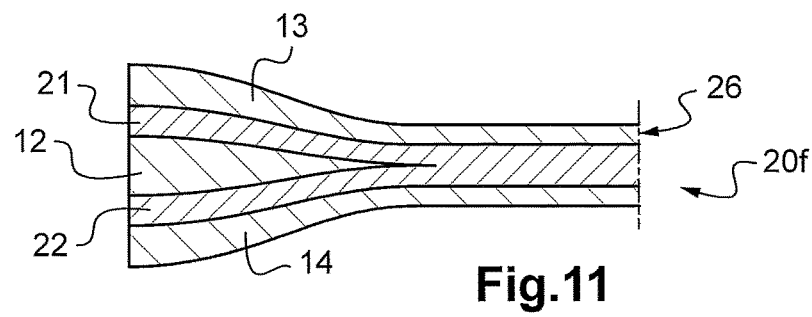

BAR OF COMPOSITE MATRIX MATERIAL

CROSS REFERENCE TO RELATED APPLICATION

This application claims priority to European patent application No. EP 13400005.8, filed on Mar. 28, 2013, the disclosure of which is incorporated in its entirety by reference herein.

BACKGROUND OF THE INVENTION (1) Field of the Invention

The invention is related to the rotary wing aircrafts technical domain. The invention concerns so-called rotors in such rotary wing aircrafts, e.g. main rotors capable of providing hovering/forward advance thrust or tail rotors for anti-torque. In some of these rotors, a bar of composite matrix material is provided for joining of the rotor blades to a rotary hub assembly of the rotor.

(2) Description of Related Art

Especially in hingeless main rotors, such a bar has a flat cross section close to the fixation at the rotary hub assembly, for the flat cross section to serve as a flapping hinge while being mainly loaded by flapping moments as well as by lead lag moments. Both moments and their deflections together with the flat cross section for a low moment of inertia in flapping direction and a large cross section for a high moment of inertia in lead lag direction result in a torsion moment at the bar. The high moment of inertia for the bar in lead lag direction is necessary to get enough cross section area for the centrifugal forces acting on the bar and for a minimum stiffness due to dynamic reasons.

In the prior art, the document U.S. Pat. No. 4,648,800 describes a fiber reinforced composite flexbeam. The flexbeam is a structural member in a rotor connector for a rotary wing aircraft to connect the rotor blade to the rotor hub. In order to achieve torsional stiffness and structural integrity, reinforcing doublers are inserted into end portions. Such doublers are contoured to conform to the desired shape of the connector to which the flexbeam will be attached. Such doublers are formed of a torsionally stiff material such as steel, composite material, graphite reinforced epoxy.

The document EP 2246257 describes a flexbeam having a connecting region to a rotor head, with a first connection point and a second connection point that lie adjacent to one the other along a line perpendicular to a radial extension of the rotor head at the end of the flexbeam facing the rotor head. The first connection point comprises a plurality of fastening attachments located one above the other and spaced upwardly and with a circular recess. The second connection point is provided with more fastening attachments.

The document U.S. Pat. No. 5,690,474 describes a composite flexbeam having a pitch region which includes a core laminate of unidirectional fiberglass material and face laminates of unidirectional graphite material bonded to mating surfaces defined by the core laminate. For addressing the problems associated with delamination or splintering in the inboard transition region, this document departs from teaching from older flexbeams that are incorporating an external composite overwrap or an edge cap.

The document JP 2010143484 describes a method for determining the cross section of a flexible beam while reducing a layer-layer shearing stress. The flexible beam has a hub side connection portion, a blade side connection portion to which a rotor blade is fixed via a member allowing feathering motion and lead and lug motion and a flexible portion ranging between the hub portion and the blade portion. The cross section perpendicular to a feathering axis forms inclined faces at both cross ends.

The document US 2006/0204364 discloses a disbond resistant multi-laminate composite product having a first member; a second member of composite material bonded to the first member; a third member of composite material bonded to at least the second member and being so positioned and arranged such that when the second and third members are stressed at least a portion of the third member will have higher stress than the adjacent second member. The third member preferably has a terminal portion adjacent the second member in which terminal portion the strain energy release rate is higher than in the adjacent second member when the second and third members are stressed. The second and third members are preferably so positioned and arranged such that the third member initiates delamination from the second member before the second member initiates delamination from the first member when the first, second and third members are under stress. A stress level indicator is preferably associated with the third member to measure the stress levels in the third member.

The document U.S. Pat. No. 6,375,426 discloses an edge member for use on a composite flexure having an exposed edge surface. The edge member includes an innermost composite ply attached to the edge surface, an outermost composite ply attached to the innermost composite ply, and at least one interior composite ply disposed between the innermost composite ply and the outermost composite ply.

The document U.S. Pat. No. 5,820,344 discloses a helicopter rotor system including a contoured flexure strap having a simplified geometrical configuration. The flexure strap serves to join the rotary hub assembly with the rotor blades and is formed of fiberglass. The primary load carrying fibers of the flexure strap preferably extend in the same direction as the longitudinal axis of the flexure strap in order to withstand the centrifugal forces acting on the strap. A cloth wrap of composite matrix material surrounds portions of the flexure strap to provide redundancy which prevents the fibers in the flexure strap from delamination when subjected to forces arising during operation of the helicopter.

BRIEF SUMMARY OF THE INVENTION

It is an object of the invention to provide a bar of composite matrix material, particularly a bar for joining a rotary wing aircraft rotor blade to a hingeless rotary hub assembly, said bar having a cross section suitable to react to torsion moments while allowing flexibility.

The solution is provided with the features of claim 1. Subclaims define embodiments.

According to embodiments of the invention a bar, particularly a bar for joining a rotary wing aircraft rotor blade to a hingeless rotary hub assembly, is made of composite matrix material. The bar has a longitudinal axis perpendicular and essentially central with regard to its cross section with upper and lower surfaces. The cross section of the bar corresponds essentially to any of the cross sections of the bar for joining a rotor blade to a hingeless rotary hub assembly, e.g. a flexbeam, at regions that are flexible, to allow the rotor blade to undergo rather small movements in a flapping direction, but relatively more important movements in a lead-lag direction and in a pitch angle direction. Any interlaminar shear stresses $\tau_{ils}$ in said flexible regions of the bar of the invention are $\tau$ more than or equal to ($\geq$) 20 N/mm$^2$.

Said composite matrix material of the bar of the invention comprises a first group of fibers which extend parallel to the longitudinal axis and a second group of fibers which extend at an angle to the longitudinal axis. A torsion box is provided along the longitudinal axis inside the cross sections of the bar. Said torsion box comprises an upper and a lower layer made of the second group of fibers. Said upper layer is offset of the longitudinal axis of the cross section and of the upper and the lower surface. The lower layer is offset of the longitudinal axis of the cross sections and of the lower and the upper surface. The cross sections of the bar between the upper and the lower layer, between the upper layer and the upper surface and between the lower layer and the lower surface are filled with the first group of fibers extending parallel to the longitudinal axis.

The bar provides for a relatively high amount of unidirectional fibers especially at the outer area of the cross section to react to the high moments and centrifugal forces occurring e.g. at the root area of a rotor blade. Consequently the bar provides as well for a flat design able to withstand the resulting torsion moment without a thickened up flexible area allowing the desired position of the virtual flapping hinge. The torsion box of the bar is stiff in torsion with the effect that this high torsion stiffness takes most of the incident torsion moments. As a consequence the already high loaded unidirectional fibers next to the upper and lower surfaces of the cross section of the bar are then less shear loaded. The torsion box of the bar helps to avoid inappropriate shear loads for the unidirectional fibers.

According to an embodiment the second group of fibers extends at an angle of more or less+/−45° relative to the longitudinal axis for high torsion stiffness.

According to a further embodiment the torsion box is closed by centrally located unidirectional layers of the first group of fibers or by additional layers of the second group of fibers with preferably more or less+/−45° lay-up as an U-section to connect the upper and lower layers to a closed torsion box, which is particularly suitable to transfer torsion loads. As a result the by bending moments and centrifugal loads already high loaded unidirectional fibers at the upper and lower surfaces of the bar have to carry significantly less torsion loads, absorbed by the torsion box inside.

According to a further embodiment the two upper and lower layers are positioned respectively distant from the upper and lower surfaces of the cross sections of the bar where the highest longitudinal forces occur, said respective distances of the two upper and lower layers from the upper and lower surfaces being determined by the respective shares of unidirectional layers of the first group of fibers or additional layers of the second group of fibers across the cross section. For high longitudinal forces the angled layers of the upper or lower shear layers have not the appropriate fiber direction. These longitudinal forces have maxima at the upper or lower surface of the cross section of the inventive bar and decrease linearly from said upper or lower surface to the center of the cross section of the inventive bar.

According to a further embodiment the respective distances of the upper and lower layers from each other increase from the lateral ends towards the longitudinal axis of the cross sections.

According to a further embodiment lateral parts of the upper unidirectional layers and the lower unidirectional layers each have respectively a share of up to 50% in direction of the longer sides of the cross section.

BRIEF DESCRIPTION OF THE SEVERAL VIEWS OF THE DRAWINGS

Embodiments of the invention are described with reference to the following description and drawings.

FIGS. 5-10 show partial cross sectional views of different bars according to the invention, and FIG. 11 shows a partial cross sectional view along a bar according to the invention.

DETAILED DESCRIPTION OF THE INVENTION

Figure 1:
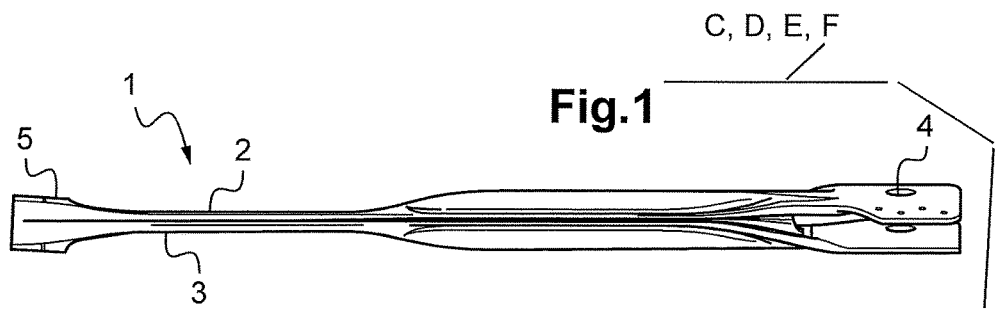
FIG. 1 shows an aircraft, a rotor and a blade with a bar seen in a lateral view, according to the invention.

On FIG. 1, a rotary wing aircraft C e.g. a helicopter, has at least one rotor D with a plurality of rotor blades E. The rotor D is e.g. a main rotor and/or an anti-torque rotor and/or a propulsion rotor. The rotor D has a bar 1 that is provided with an upper surface 2 and a lower surface 3. The bar 1 is a flexbeam that joins a rotor blade E to a hingeless rotary hub assembly F. The bar 1 is joint at a blade end 4 to the rotor blade E and at a root end 5 to the hingeless rotary hub assembly.

Figure 2:
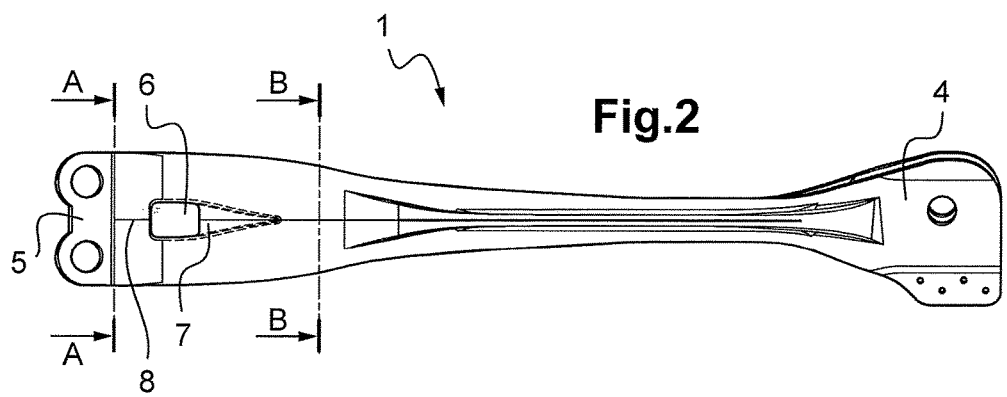
FIG. 2 shows a top view of the bar according to the invention.

According to FIG. 2 corresponding features are referred to with the references of FIG. 1. At regions between cross sections A-A to B-B the bar 1 is flexible with interlaminar shear stresses $\tau_{ils}$ that are exceeding twenty N/mm² (i.e. $\tau_{ils} \geq 20$ N/mm²) to allow the rotor blade E to undergo movements in a flapping direction, a lead-lag direction and in a pitch angle direction. An opening 6 and a recess 7 perpendicular through the upper surface 2 and the lower surface 3 are provided in the bar 1 towards the root end 5 for better adapted torsion resistance and/or flexibility of the bar 1. Bar 1 has a longitudinal axis 8.

Figure 3:
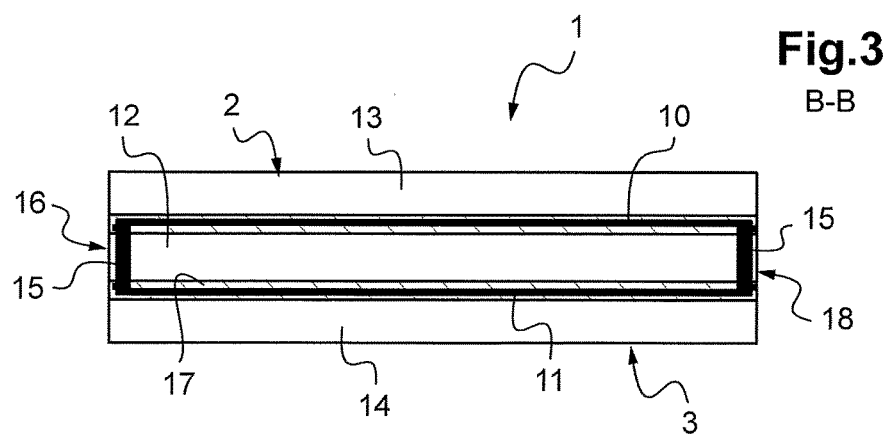
FIG. 3 shows a schematic cross sectional view of a bar according to the invention.

According to FIG. 3 corresponding features are referred to with the references of FIG. 1, 2. The essentially rectangular cross section B-B of the bar 1 has dimensions of approximately 180-400 mm by 20-120 mm, particularly 180 by 30 mm. The essentially rectangular cross section B-B of the bar 1 comprises an upper layer 10 and a lower layer 11 of a second group of fibers with a lay-up of more or less forty five degrees (i.e. +/−45° lay-up) relative to the longitudinal axis 8. Said upper and lower layers 10, 11 are essentially parallel to the upper surface 2 and the lower surface 3 of the longer sides of the essentially rectangular cross section B-B and said upper and lower layers 10, 11 are approximately equally offset of the longitudinal axis 8 and offset of the upper surface 2 and the lower surface 3.

Central unidirectional layers 12 of the first group of fibers are arranged essentially parallel to the longitudinal axis 8 between the upper layer 10 and the lower layer 11 of the cross section B-B of the bar 1. Upper unidirectional layers 13 of the first group of fibers are arranged essentially parallel to the longitudinal axis 8 between the upper layer 10 and the upper surface 2 and lower unidirectional layers 14 are arranged between the lower layer 11 and the lower surface 3.

The central unidirectional layers 12 of the first group of fibers or additional layers 15 of the second group of fibers with preferable of more or less forty-five degrees (i.e. +/−45°) lay-up connect the upper and lower layers 10, 11 at lateral left and right sides 16, 18 of the cross section B-B to a closed torsion box 17.

Figure 4:
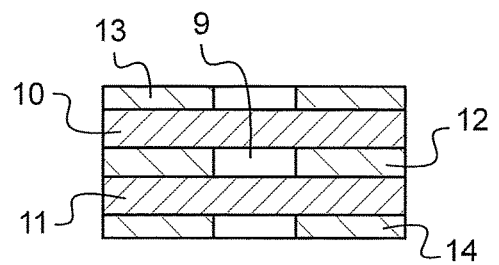
FIG. 4 shows shares of fiber groups in a cross sectional view representative for any of the bars according to the invention.

According to FIG. 4 corresponding features are referred to with the references of FIG. 1-3. The central unidirectional layers 12 of the first group of fibers arranged essentially parallel to and around the longitudinal axis 8 between the upper layer 10 and the lower layer 11 have a ten to eighty-five percent share (10%-85% share) in direction of the shorter sides of the cross sections.

The upper unidirectional layers 13 of the first group of fibers arranged essentially parallel to the longitudinal axis between the upper layer 10 and the upper surface 2 and the lower unidirectional layers 14 arranged between the lower layer 11 and the lower surface 3 each have respectively a five to forty-two point five percent share (5%-42.5% share) in direction of the shorter sides of the cross sections of the bar 1.

The upper layer 10 and the lower layer 11 with the second group of fibers with +/−45° fabric layers providing the torsion box 17 each have a two point five to forty percent share (2.5%-40% share) in direction of the shorter sides of the cross sections.

The central unidirectional layers 12, the upper unidirectional layers 13 and the lower unidirectional layers 14 are each provided as rovings made of the first group of fibers. The upper layer 10 and the lower layer 11 are fabric layers made of the second group of fibers. The central unidirectional layers 12 may be separated by a core element 9, said core element 9 comprising fabric layers and/or foam and/or rovings and/or thermoplastic fillers and/or scrap respectively processed, e.g. cemented, with resin.

The central unidirectional layers 12 separated by the core element 9 each have respectively a share of up to fifty percent (50%) in direction of the longer sides of the cross sections of the bar 1. The upper unidirectional layers 13 and the lower unidirectional layers 14 are each separated by a central gap in direction of the longer sides of the cross sections of the bar 1. Lateral parts of the upper unidirectional layers 13 and the lower unidirectional layers 14 each have respectively a share of up to 50% in direction of the longer sides of the cross sections of the bar 1.

According to FIG. 5 corresponding features are referred to with the references of FIGS. 1-4. A wedge shaped cross section 20 of bar 1 has a decreasing height towards a left side 16. A curved upper fabric layer 21 and a curved lower fabric layer 22 each made of the second group of fibers have respectively increasing distances relative to each other towards the longitudinal axis 8. A closed torsion box 17 is provided by the central unidirectional layers 12 connecting laterally the upper and lower layers 21, 22 of bar 1.

According to FIG. 6 corresponding features are referred to with the references of FIGS. 1-5. A wedge shaped cross section 20a of bar 1 with the decreasing height towards the left side 16, the curved upper fabric layer 21 and the curved lower fabric layer 22 each made of the second group of fibers and having respectively increasing distances relative to each other towards the longitudinal axis 8 is provided with the closed torsion box 17 by a laterally mounted U shaped cap 23 with brackets turned towards the longitudinal axis 8 and connecting the upper and lower layers 21, 22.

According to FIG. 7 corresponding features are referred to with the references of FIGS. 1-6. A wedge shaped cross section 20b of bar 1 with the decreasing height towards the left side 16, the curved upper fabric layer 21 and the curved lower fabric layer 22 each made of the second group of fibers and having respectively increasing distances relative to each other towards the longitudinal axis 8 is provided with the closed torsion box 17 by the laterally connecting upper and lower fabric layers 21, 22.

According to FIG. 8 corresponding features are referred to with the references of FIGS. 1-7. A wedge shaped cross section 20c of bar 1 with the decreasing height towards the left side 16, the curved upper fabric layer 21 and the curved lower fabric layer 22 each made of the second group of fibers and having respectively increasing distances relative to each other towards the longitudinal axis 8 is provided with the closed torsion box 17 by a laterally mounted connecting block 24 for connection of the upper and lower layers 21, 22.

According to FIG. 9 corresponding features are referred to with the references of FIGS. 1-8. A wedge shaped cross section 20d of bar 1 with the decreasing height towards the left side 16, the curved upper fabric layer 21 and the curved lower fabric layer 22 each made of the second group of fibers and having respectively increasing distances relative to each other towards the longitudinal axis 8 is provided with the closed torsion box 17 by a U shaped cap 25 mounted inside the cross section with brackets turned away from the longitudinal axis 8 and connecting the upper and lower layers 21, 22.

According to FIG. 10 corresponding features are referred to with the references of FIGS. 1-9. A wedge shaped cross section 20e of bar 1 with the decreasing height towards the left side 16, the curved upper fabric layer 21 and the curved lower fabric layer 22 each made of the second group of fibers and having respectively increasing distances relative to each other towards the longitudinal axis 8 is provided with the closed torsion box 17 made by upper and lower fabric layers 21, 22 of an endless tissue.

According to FIG. 11 corresponding features are referred to with the references of FIGS. 1-10. A curved cross section 20f of bar 1 with decreasing height towards an extended longitudinal end 26 is provided with the curved upper fabric layer 21 and the curved lower fabric layer 22 each made of the second group of fibers and having respectively increasing distances relative to each other along the longitudinal axis 8 towards inside the torsion box 17. The connected upper and lower fabric layers 21, 22 are laterally integrated to the extended right end 26.

The central unidirectional layers 12, the upper unidirectional layers 13 and the lower unidirectional layers 14 of the cross sections 20-20f are respectively provided as rovings made of the first group of fibers.

| Reference List | |
| --- | --- |
| 1 | bar |
| 2 | upper surface |
| 3 | lower surface |
| 4 | blade end |
| 5 | root end |
| 6 | opening |
| 7 | recess |
| 8 | longitudinal axis |
| 9 | core element |
| 10 | upper layer |
| 11 | lower layer |
| 12 | central unidirectional layer |
| 13 | upper unidirectional layer |
| 14 | lower unidirectional layer |
| 15 | additional layer |
| 16 | left side |
| 17 | torsion box |
| 18 | right side |
| 19 | n/a |
| 20 | cross sections |
| 21 | curved upper layer |
| 22 | curved lower layer |
| 23 | laterally mounted u-shaped cap |
| 24 | connecting block |

-continued

| Reference List | |
|---|---|
| 25 | u-shaped cap |
| 26 | longitudinal end |
| C | Rotary wing aircraft e.g. a helicopter |
| D | Rotor: e.g. helicopter main rotor |
| E | Rotor blade |
| F | Hingeless rotary hub assembly |

What is claimed is:

1. A bar of composite matrix material, the bar adapted to join a rotor blade of a rotor to a hingeless rotary hub assembly of a rotary wing aircraft, the bar having a longitudinal axis perpendicular to a cross section of the bar, the cross section having upper and lower surfaces, the longitudinal axis having essentially equal distances from the upper and lower surfaces, and the cross sections joining the rotor blade to the hingeless rotary hub assembly being located at regions that are flexible to allow the rotor blade to undergo movements in a flapping direction, in a lead-lag direction and in a pitch angle direction, the bar of composite matrix material comprising:
a first group of fibers which extend parallel to the longitudinal axis, wherein the first group of fibers define the upper and lower surfaces of the cross section; and
a second group of fibers which extend at an angle to the longitudinal axis, the second group of fibers defining an uppermost layer and a lowermost layer of a torsion box extending along the longitudinal axis, the uppermost and lowermost layers being respectively offset of the longitudinal axis and of the upper and the lower surfaces, the uppermost and lowermost layers being laterally joint, wherein the cross section (i) between the uppermost and lowermost layers, (ii) between the uppermost layer and the upper surface, and (iii) between the lowermost layer and the lower surface is at least partially filled, in a direction of the longer sides of the cross section, with the first group of fibers extending essentially parallel to the longitudinal axis, and the first group of fibers between the uppermost and lowermost layers define a thickness in a first direction extending from the lowermost layer to the uppermost layer, and wherein the thickness increases along the cross section in a second direction orthogonal to the first direction.

2. The bar according to claim 1, wherein the second group of fibers extend at an angle of approximately 45 degrees relative to the longitudinal axis.

3. The bar according to claim 1, wherein the torsion box is closed by centrally located unidirectional layers of the first group of fibers or by additional layers of the second group of fibers with approximately 45 degrees lay-up as an U-section to connect the uppermost and lowermost layers.

4. The bar according to claim 1, wherein the uppermost and lowermost layers are respectively positioned away from the upper and lower surfaces, at least 5% of a height of the cross section.

5. The bar according to claim 1, wherein a distance between the uppermost layer and the lowermost layer increases at a first rate from a lateral end of the cross section towards the longitudinal axis of the cross section, and wherein a distance between the upper surface and the lower surface increases at a second rate different than the first rate from a lateral end of the cross section towards the longitudinal axis of the cross section.

6. The bar according to claim 1, wherein the first group of fibers between the uppermost and lowermost layers defines lateral segments spaced apart in the second direction, and wherein a core element is disposed between the spaced apart lateral segments.

7. The bar according to claim 1, wherein the cross section defines a first height between the uppermost and lowermost layers at a lateral end of the cross section and a second height between the uppermost and lowermost layers at the longitudinal axis that is greater than the first height.

8. The bar according to claim 1, wherein the cross section defines a first height between the upper and lower surfaces at a lateral end of the cross section and a second height between the upper and lower surfaces at the longitudinal axis that is greater than the first height.

9. A flexbeam for a rotary wing aircraft, the flexbeam comprising:
a root end;
a blade end, wherein a longitudinal axis extends from the root end to the blade end;
a first group of fibers extending substantially parallel to the longitudinal axis, the first group of fibers including an upper layer defining an upper surface of the flexbeam, a lower layer defining a lower surface of the flexbeam, and a central layer disposed between the upper layer and the lower layer; and
a second group of fibers extending at an angle to the longitudinal axis, the second group of fibers including an upper torsion layer disposed between the upper layer and the central layer, and a lower torsion layer disposed between the lower layer and the central layer, wherein the central layer defines a thickness extending in a first direction from the lower torsion layer to the upper torsion layer, and wherein the thickness increases along a cross section of the flexbeam in a second direction orthogonal to the first direction.

10. The flexbeam according to claim 9, wherein a distance between the upper torsion layer and the lower torsion layer increases at a first rate from a lateral end of the flexbeam towards the longitudinal axis of the flexbeam, and wherein a distance between the upper surface and the lower surface increases at a second rate different than the first rate from the lateral end of the cross section towards the longitudinal axis.

11. The flexbeam according to claim 9, wherein the upper torsion layer is a curved upper torsion layer that extends along an arc from the lateral end of the cross section towards the longitudinal axis of the cross section, wherein the lower torsion layer is a curved lower torsion layer that extends along an opposing arc from the lateral end of the cross section towards the longitudinal axis, and wherein the central layer extends between the curved upper torsion layer and the curved lower torsion layer along the cross section.

12. The flexbeam according to claim 9, wherein the central layer is a discontinuous central layer that defines lateral segments spaced apart in the second direction, and wherein the flexbeam further includes a core element disposed between the spaced apart lateral segments.

13. The flexbeam according to claim 9, wherein the cross section defines a first height of the central layer at a lateral end of the cross section of the flexbeam and a second height of the central layer at the longitudinal axis that is greater than the first height.

14. The flexbeam according to claim 9, wherein the cross section defines a first height between the upper and lower surfaces at a lateral end of the cross section and a second height between the upper and lower surfaces at the longitudinal axis that is greater than the first height.

15. A bar of composite matrix material, the bar adapted to join a rotor blade of a rotor to a hingeless rotary hub assembly of a rotary wing aircraft, the bar of composite matrix material comprising:
  a root end;
  a blade end, wherein a longitudinal axis extends from the root end to the blade end;
  a first group of fibers extending substantially parallel to the longitudinal axis, the first group of fibers including an upper layer defining an upper surface of the bar, a lower layer defining a lower surface of the bar, and a central layer disposed between the upper layer and the lower layer; and
  a second group of fibers extending at an angle to the longitudinal axis, the second group of fibers including an upper torsion layer disposed between the upper layer and the central layer, and a lower torsion layer disposed between the lower layer and the central layer, wherein the central layer defines a thickness extending in a first direction from the lower torsion layer to the upper torsion layer, and wherein the thickness increases along a cross section of the flexbeam in a second direction orthogonal to the first direction.

16. The bar according to claim 15, wherein a distance between the upper torsion layer and the lower torsion layer increases at a first rate from a lateral end of the bar towards the longitudinal axis of the bar, and wherein a distance between the upper surface and the lower surface increases at a second rate different than the first rate from the lateral end of the cross section towards the longitudinal axis.

17. The bar according to claim 15, wherein the upper torsion layer is a curved upper torsion layer that extends along an arc from the lateral end of the cross section towards the longitudinal axis of the cross section, wherein the lower torsion layer is a curved lower torsion layer that extends along an opposing arc from the lateral end of the cross section towards the longitudinal axis, and wherein the central layer extends between the curved upper torsion layer and the curved lower torsion layer along the cross section.

18. The bar according to claim 15, wherein the central layer is a discontinuous central layer that defines lateral segments spaced apart in the second direction, and wherein the bar further includes a core element disposed between the spaced apart lateral segments.

19. The bar according to claim 15, wherein the cross section defines a first height of the central layer at a lateral end of a cross section of the bar and a second height of the central layer at the longitudinal axis that is greater than the first height.

20. The bar according to claim 15, wherein the cross section defines a first height between the upper and lower surfaces at a lateral end of the cross section and a second height between the upper and lower surfaces at the longitudinal axis that is greater than the first height.

* * * * *